April 11, 1944. L. GESS 2,346,422
INDICATING INSTRUMENT
Filed Oct. 14, 1941
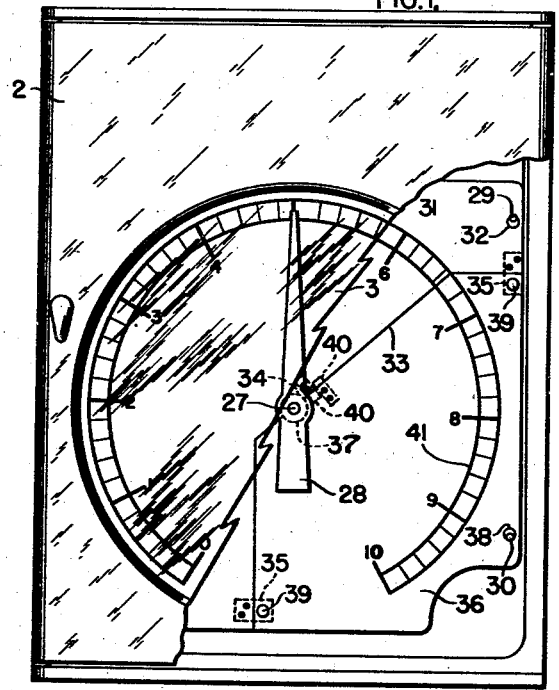
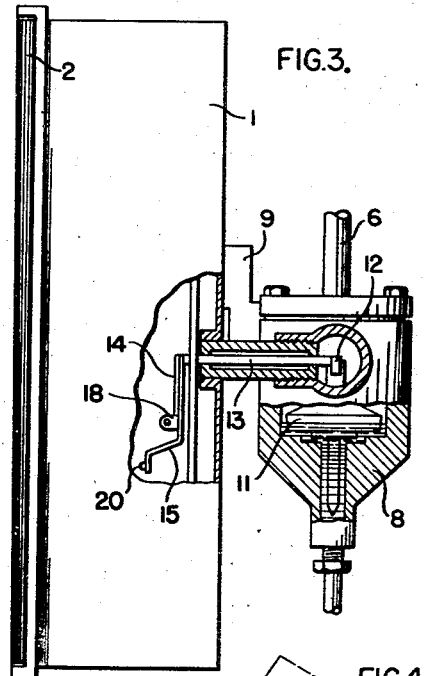
FIG.1. FIG.2. FIG.3. FIG.4.
INVENTOR.
LOUIS GESS
BY C. B. Spangenberg
ATTORNEY Patented Apr. 11, 1944

2,346,422

UNITED STATES PATENT OFFICE 2,346,422

INDICATING INSTRUMENT

Louis Gess, Jenkintown, Pa., assignor to The Brown Instrument Company, Philadelphia, Pa., a corporation of Pennsylvania Application October 14, 1941, Serial No. 414,923

2 Claims. (Cl. 116—129)

The present invention relates to indicating instruments and more particularly to the formation of a scale plate for such instruments.

In most indicating instruments a scale plate is provided which serves the double purpose of hiding and protecting the measuring elements of the instrument and of having a scale on it that cooperates with an indicating pointer to give the value of the condition being measured. If the pointer is concentric with the scale, as is often the case, and some adjustment is necessary for the measuring elements, it is necessary to remove both the pointer and scale plate to make the adjustments. This is a time consuming operation, particularly with respect to correctly replacing the pointer on its shaft when the adjustments have been made. The latter is of particular importance, since if the pointer is not properly replaced on its shaft it will indicate an incorrect value.

An object of the present invention is to provide a scale plate for an indicating instrument that is formed in sections so that a portion thereof may be removed to permit adjustment of the measuring elements without the necessity of removing the pointer.

A further object of the invention is to provide an indicating instrument with a scale plate that may be removed in sections from the instrument without the necessity of disconnecting the indicating pointer from its actuating mechanism.

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

Of the drawing:

Fig. 1 shows a view of the instrument with a portion of the door broken away,

Fig. 2 is a view of the instrument with the door removed and a portion of the scale plate removed.

Fig. 3 is a side view of the instrument partly in section and,

Fig. 4 is a back view of the instrument showing the manometer partly in section.

Referring to the drawing, there is shown a casing 1 which is provided with a door 2 that has a window 3 formed in it through which the indicating members may be seen. While the instrument may be used to indicate the value of any variable condition it is shown herein as indicating the value of flow through a pipe 4. To this end the pipe is provided with an orifice 5 that sets up a differential pressure in accordance with changes in flow. Pressure taps 6 and 7 lead from each side of the orifice to the legs of a manometer 8, which may be of any conventional type. For purposes of this description, however, the flow meter is shown as being of the mechanical type and is shown herein as consisting of a U tube manometer 8 which is supported by a suitable bracket 9 to the back of the instrument casing 1. The legs of this manometer are filled with a sealing liquid 10 such as mercury, the level of which in the opposite legs changes in accordance with the differential pressure supplied through the pressure taps 6 and 7. In this fashion the level of the mercury in the legs of the manometer varies in accordance with the flow through pipe 4.

A float 11 rests on the surface of the mercury in the high pressure leg of the manometer and rises and falls as the mercury level in this leg changes. Motion of the float is imparted to an arm 12 that is attached to a shaft 13 which extends through a suitable pressure tight bearing in the manometer 8 and through the wall of the instrument casing 1.

Rotation of the shaft 13 is imparted to an indicating pointer in the instrument casing by means of an arm 14 that is attached to this shaft and which arm is fastened to an arm 15 that is free to rotate on the shaft 13. Arms 14 and 15 are held in a given position relative to each other by means of an adjusting screw 16 that extends through a turned up edge 17 on the arm 15 and is threaded into a turned up edge 18 of the arm 14. These arms are kept in a normal position relative to each other by means of a spring 19 that bears with its ends against the edges 17 and 18. This spring also serves to prevent accidental rotation of the adjusting screw 16.

Movement of the arm 15 is transmitted to an indicating pointer by means of a link 20 that is attached at one end to the arm 15 and at its other end to a slider 21 that is adjustably fastened to a slot formed on the lower end of a lever 22 which is pivoted at 23. A segment lever 24 is also pivoted at 23 and is attached to the lever 22 in any suitable manner so that it will move with this lever around the pivot. Lever 24 is formed on its upper end with an arcuate face 25 which is provided with gear teeth that mesh with a pinion 26 which is mounted on a shaft 27. The shaft 27 is suitably journalled for rotation in the instrument casing 1 and has attached to its front end an indicating pointer 28. From the above description it will be seen that this pointer 28 will be moved around the shaft 27 as a center in accordance with variations in the flow of liquid through the pipe 4 as measured by the position of the float 11 on the sealing liquid of the manometer.

A pair of upper supporting pins 29 and a pair of lower supporting pins 30 extend from the back of casing 1 and are adapted to support a scale plate which serves the dual purpose of protecting the measuring elements that have just been described and having thereon a scale which cooperates with the pointer 28. This scale plate is formed of two parts, the large part 31 of which is provided with three openings 32 that are received by the two pins 29 and the left pin 30. This plate has a diagonal edge 33 which is provided with a semi-circular cut out portion 34 that extends around the shaft 27. A pair of lugs 35 are welded or otherwise attached to the under surface of the scale plate part 31. One of these extends vertically and the other horizontally and they serve, along with the second or right supporting post 30, to hold a small scale plate part 36 in a position in which it cooperates with the part 31 as shown in Fig. 1. The scale plate part 36 is provided with a semi-circular cut out portion 37 that cooperates with the cut out portion 34 of part 31 to form an opening in the scale plate for the shaft 27. The part 36 is provided with an opening 38 that receives the second supporting post 30. Thumb screws 39 extend through openings provided in the part 36 and are threaded into openings in the lugs 35 to hold the scale plate part 36 rigidly in place.

It is noted that the pins 29 and 30 are separated slightly more than the distance between the upper openings 32 in part 31 and the lower openings 32 and 38 in parts 31 and 36 and are provided with reduced neck portions near their outer ends. In placing the scale plate on the instrument the lower pins 30 are bent upwardly a slight amount as they pass through the openings 32 and 38. Thus the neck portions of the pins bind against the edge of the openings that receive them and the scale plate is rigidly held in place.

Reinforcing members 40, one of which is on the part 31 and the other of which is on the part 36, serve to keep the central portions of the two parts 31 and 36 from moving relative to each other. A suitable scale 41 that is concentric with shaft 27 is provided on the front of the two segment plate parts so that it will cooperate with the pointer 28 to indicate the value of the flow in pipe 4.

With the construction that has been described it will be seen that when looking at the instrument there appears to be a solid scale plate back of the window 3 which plate has a scale on it that cooperates with the pointer 28 to give an indication of the value of the flow. When, however, it is necessary to make some adjustment to the motion transmitting linkage which lies behind the scale plate either the part 36 or both the parts 36 and 31 can be removed from the instrument without in any way affecting the pointer 28 and its relation to the rest of the measuring elements. When it is desired to remove the part 36 it is only necessary to remove the two thumb screws 39 and lift this part out of the instrument. If the scale plate part 31 is also to be removed it is only necessary to lift this plate off of the supporting pins 29 and the supporting pin 30. The provision of this simple and easily assembled scale plate for an indicating instrument renders the adjustment of the instrument very simple and also insures that any adjustments which have been made will not be disturbed when the scale plate is replaced. The feature of being able to remove and replace the scale plate without in any way disturbing the relation between shaft 27 and pointer 28 insures that the adjustments made to the instrument will not be disturbed.

While in accordance with the provisions of the statutes, I have illustrated and described the best form of this invention now known to me, it would be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described this invention, what I claim as new and desire to secure by Letters Patent is:

1. In a condition indicating instrument having a casing containing condition actuated means having adjusting means therefor, the combination of a shaft operated by the condition actuated means, a pointer carried by the shaft, a scale plate located in front of the condition actuated means and between the condition actuated means and the pointer for cooperating with the pointer to indicate the value of the condition, said scale plate being formed of two sections and having an opening along their contiguous edges for accommodating the shaft, and means for removably securing the sections of the scale plate to the casing to permit access to the interior of the casing for adjusting the adjusting means of the condition actuated means without disturbing the pointer.

2. In a condition indicating instrument having a casing containing condition actuated means having adjusting means therefor, the combination of a shaft operated by the condition actuated means, a pointer carried by the shaft, a scale plate located in front of the condition actuated means and between the condition actuated means and the pointer for cooperating with the pointer to indicate the value of the condition, said scale plate being formed of two sections and having an opening along their contiguous edges for accommodating the shaft, and means for detachably securing the sections of the scale plate together and for removably securing the sections of the scale plate to the casing to permit access to the interior of the casing for adjusting the adjusting means of the condition actuated means without disturbing the pointer.

LOUIS GESS.